Figure 1:
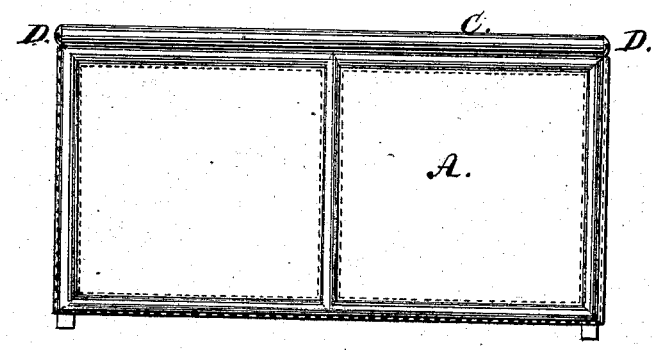
Figure 2:
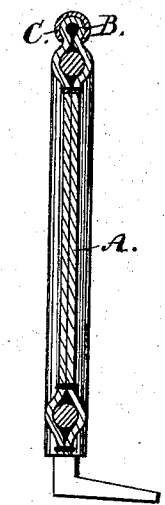

W. C. PEEL.
Dash-Boards.

No. 158,182.

Patented Dec. 29, 1874.

Witnesses:

Inventor:

UNITED STATES PATENT OFFICE.

WILLIAM C. PEEL, OF SPRINGFIELD, OHIO, ASSIGNOR OF ONE-HALF HIS RIGHT TO JUSTUS V. ELSTER, OF SAME PLACE.

IMPROVEMENT IN DASH-BOARDS.

Specification forming part of Letters Patent No. 158,182, dated December 29, 1874; application filed October 20, 1874.

*To all whom it may concern:*

Be it known that I, WILLIAM C. PEEL, of Springfield, Clarke county, Ohio, have invented certain Improvements in the Method of Putting Molding on the Dashes of Vehicles, of which the following is a specification:

The object of my invention is to devise an easier, cheaper, and neater method of putting molding on the dash-boards of vehicles, and is an improvement on that patented to me March 17, 1874. In that method the leather dash was in two pieces, and a bead was formed by a row of stitching. This involved considerable labor, which is dispensed with in my improved method.

I make the dash A of one piece of leather, which I double in the center. This forms a swell, B. The molding C is slipped on over this swell, which is sufficient to retain the molding in its place without either bead or core; and the retaining-screws D are then put in, to prevent its being drawn off at either end, and to make a finish.

The advantages of this method are: It saves the cost of stitching, or of a core, and is much more handsome in appearance.

Having thus described my invention, what I claim is—

1. A dash-cover made of one piece of leather, or other suitable material, doubled across the center, or thereabout, and having a metal molding slipped over the swell produced by said doubling, substantially as set forth.

2. The combination of the molding C, the dash A, the swell B, and retaining-screws D.

WM. C. PEEL.

Witnesses:
J. M. KOLBENSTETTER,
ASA WHITEHEAD.